United States Patent
Park

(10) Patent No.: US 10,698,473 B2
(45) Date of Patent: Jun. 30, 2020

(54) METHOD AND APPARATUS FOR REDUCING ETHERNET POWER CONSUMPTION FOR VEHICLES

(71) Applicants: HYUNDAI MOTOR COMPANY, Seoul (KR); KIA MOTORS CORPORATION, Seoul (KR)

(72) Inventor: Soon Chul Park, Hwaseong-si (KR)

(73) Assignees: HYUNDAI MOTOR COMPANY, Seoul (KR); KIA MOTORS COMPANY, Seoul (KR)

( * ) Notice: Subject to any disclaimer, the term of this patent is extended or adjusted under 35 U.S.C. 154(b) by 94 days.

(21) Appl. No.: 16/189,548

(22) Filed: Nov. 13, 2018

(65) Prior Publication Data
US 2020/0117262 A1   Apr. 16, 2020

(30) Foreign Application Priority Data
Oct. 11, 2018  (KR) .......................... 10-2018-0120945

(51) Int. Cl.
*G06F 1/32* (2019.01)
*G06F 1/324* (2019.01)
*H04L 12/12* (2006.01)
*H04L 12/40* (2006.01)
*B60R 16/023* (2006.01)

(52) U.S. Cl.
CPC .............. *G06F 1/324* (2013.01); *H04L 12/12* (2013.01); *H04L 12/40039* (2013.01); *B60R 16/0231* (2013.01); *H04L 2012/40273* (2013.01)

(58) Field of Classification Search
CPC ... G06F 1/324; G06F 1/3243; H04L 12/40039
See application file for complete search history.

(56) References Cited

U.S. PATENT DOCUMENTS

| 2009/0187778 A1* | 7/2009 | Diab ..................... G06F 1/3209 713/322 |
| 2016/0050286 A1* | 2/2016 | Diab ..................... B60W 50/00 701/36 |

* cited by examiner

*Primary Examiner* — Albert Wang
(74) *Attorney, Agent, or Firm* — Lempia Summerfield Katz LLC

(57) ABSTRACT

A method for reducing power consumption in an electronic control unit (ECU) equipped with an Ethernet communication function and mounted in a vehicle include initializing a physical layer upon restarting of the physical layer and setting a transmission mode to a data mode. The method includes generating a clock signal having a first frequency for Ethernet communication, checking presence or absence of a normal frame to be transmitted, checking presence or absence of an idle frame based on a reception signal symbol, and determining whether to change the frequency of the clock signal based on checking results in the checking of presence or absence of a normal frame and the checking of presence or absence of an idle frame.

20 Claims, 5 Drawing Sheets

METHOD AND APPARATUS FOR REDUCING ETHERNET POWER CONSUMPTION FOR VEHICLES

CROSS-REFERENCE TO RELATED APPLICATION

This application is based on and claims the benefit of priority to Korean Patent Application No. 10-2018-0120945, filed on Oct. 11, 2018, which is hereby incorporated by reference as if fully set forth herein.

BACKGROUND

Field of the Disclosure

The present disclosure relates to a method and an apparatus for reducing Ethernet power consumption for vehicles. More specifically, the present disclosure relates to a method and an apparatus for reducing Ethernet power consumption for vehicles which can reduce power consumption in Ethernet communication by varying a clock signal when only idle frames are present in an Ethernet communication network in a vehicle.

Discussion of the Related Art

Ethernet is the most widely used short-range communication network technology. Although Ethernet has been standardized by the Institute of Electrical and Electronics Engineers (IEEE), Ethernet was developed by Xerox and improved by Xerox, Digital Equipment Corporation (DEC) and Intel.

When on-board communication based on the currently popularized Controller Area Network (CAN) is substituted by Ethernet communication, only about 10% of the maximum bandwidth provided through an Ethernet communication is used for actual data transmission. The remaining 90% may be idle.

If the maximum transmission rate of high-speed CAN communication is 1 Mbps and the bus load is 100%, the Ethernet communication speed for vehicles is 100 Mbps and the bus load in this case is about 10%.

Utilization efficiency of the Ethernet bandwidth for vehicles may increase if the amount of on-board communication data increases due to autonomous driving and vehicle-to-vehicle communication in the future. However, currently, the utilization efficiency of the Ethernet bandwidth for vehicles is very low.

Particularly, when Ethernet communication is performed in a state in which a vehicle has not started, for example, while in "Key OFF", "ACC", or "IG ON" states, power consumption increases compared to conventional high-speed CAN communication, causing vehicle battery discharge.

Although conventional CAN communication has a communication speed lower than Ethernet communication, it does not generate an additional communication signal such as an idle frame of Ethernet communication when transmitted data is not present. In other words, conventional CAN communication has no power consumption when transmitted data is not present, whereas Ethernet communication generates an idle frame, causing power consumption.

Accordingly, a technology for minimizing power consumption in an idle state in Ethernet communication for vehicles is required.

SUMMARY

Accordingly, the present disclosure is directed to a method and an apparatus for reducing Ethernet power consumption for vehicles that substantially obviate one or more problems due to limitations and disadvantages of the related art.

An object of the present disclosure is to provide a method and an apparatus for reducing Ethernet power consumption for vehicles which can reduce power consumption without affecting data transmission and reception by controlling a clock rate according to an idle state during Ethernet communication for a vehicle.

It will be appreciated by persons of ordinary skill in the art that the objects that can be achieved with the present disclosure are not limited to what has been particularly described hereinabove. The above and other objects that the present disclosure could achieve will be more clearly understood from the following detailed description.

The present disclosure provides a method and an apparatus for reducing Ethernet power consumption for vehicles.

A method for reducing power consumption in an electronic control unit (ECU) equipped with an Ethernet communication function and mounted in a vehicle according to an embodiment of the present disclosure may include initializing a physical layer upon restarting of the physical layer and setting a transmission mode to a data mode. The method may also include generating a clock signal having a first frequency for Ethernet communication. The method may further include checking presence or absence of a normal frame to be transmitted. The method may further include checking presence or absence of an idle frame based on a reception signal symbol. The method may also include determining whether to change the frequency of the clock signal based on checking results in the checking of presence or absence of a normal frame and in the checking of presence or absence of an idle frame.

In this example, upon checking that a normal frame to be transmitted is not present in the checking of presence or absence of a normal frame and that an idle frame is present in the checking of presence or absence of an idle frame, the first frequency of the clock signal may be changed to a second frequency.

Further, when a normal frame to be transmitted is present or a frame checked based on the reception signal symbol being a normal frame in a state in which the first frequency has been changed to the second frequency, the frequency of the clock signal may be changed to the first frequency.

Further, when the reception signal symbol is a zero symbol (0, 0) in a state in which a normal frame to be transmitted is not present, a frame receiver thereafter may be determined to be a normal frame and the frequency of the clock signal may be changed to the first frequency.

Further, the second frequency may be lower than the first frequency.

The method for reducing power consumption may further include identifying whether the ECU is a master device, wherein the frequency of the clock signal is changeable only when the ECU is a master device.

Further, the checking of presence or absence of an idle frame may include checking whether a reception signal symbol pattern is a predefined electrostatic discharge (ESD) symbol pattern. A frame received thereafter may be determined to be the idle frame when the reception signal symbol pattern is the ESD symbol pattern.

In this example, the ESD symbol pattern may be composed of three consecutive reception signal symbols: (0, 0), (0, 0) and (0, 1).

Further, the idle frame may have a variable length.

An apparatus for reducing Ethernet power consumption for vehicles, mounted in a vehicle to perform Ethernet communication according to another embodiment of the present disclosure may include a media access control (MAC) layer including a main controller and a clock generator. The apparatus may further include a physical layer for processing data transmitted/received to/from the MAC layer to perform Ethernet communication. The physical layer may include a physical coding sublayer (PCS) transmitter for generating transmission signal symbols based on transmission data received by the main controller. The physical layer may also include a physical medium attachment (PMA) transmitter for generating an Ethernet signal based on the transmission signal symbols received from the PCS transmitter and transmitting the Ethernet signal through a communication line. The physical layer may further include a PMA receiver for generating reception signal symbols based on an Ethernet signal detected in the communication line. The physical layer may further include a PCS receiver for receiving the reception signal symbols from the PMA receiver, generating reception data and transmitting the reception data to the main controller. The physical layer may also include a clock controller for receiving a clock signal having a first frequency from the clock generator and changing the frequency of the clock signal based on a communication state on the communication line.

The clock controller may include an idle detector for determining a time at which the frequency of the clock signal is changed based on a transmission enable signal (signal TX_EN) received from the main controller and the reception signal symbols. The clock controller may further include a clock converter for changing the frequency of the clock signal according to a control signal of the idle detector and for outputting the clock signal.

Further, the clock signal output from the clock converter may be provided to the PCS transmitter and the PMA transmitter.

Further, when the idle detector confirms that a normal frame to be transmitted is not present according to the signal TX_EN and confirms that a frame to be received is an idle frame according to the reception signal symbols, the frequency of the clock signal may be changed to a second frequency.

Further, the clock converter may change the frequency of the clock signal to the first frequency when a normal frame to be transmitted is present or a frame checked based on the reception signal symbols is a normal frame in a state in which the frequency of the clock signal has been changed to the second frequency.

Further, when the reception signal symbols are zero symbols (0, 0) in a state in which a normal frame to be transmitted is not present, a frame to be received thereafter may be determined to be a normal frame and the frequency of the clock signal may be changed to the first frequency.

Further, the second frequency may be lower than the first frequency.

Further, the frequency of the clock signal may be changeable only when the apparatus for reducing Ethernet power consumption for vehicles is a master device.

Further, the idle detector may check whether a reception signal symbol pattern is a predefined ESD symbol pattern and determine that a frame received thereafter is an idle frame when the reception signal symbol pattern is the ESD symbol pattern.

Further, the ESD symbol pattern may be composed of three consecutive reception signal symbols (0, 0), (0, 0) and (0, 1).

Further, the main controller may transmit a clock converter enable signal (signal CC_EN) for enabling or disabling the operation of the clock converter to the clock controller. The clock controller may bypass a clock signal from the clock generator such that the control signal is provided to the PCS transmitter and the PMA transmitter when the clock converter is disabled by the signal CC_EN.

The above-described embodiments of the present disclosure are merely part of several embodiments of the present disclosure. Various embodiments reflecting the technical features of the present disclosure can be derived and understood by those of ordinary skill in the art based on the following detailed description.

The method and the apparatus according to the present disclosure may have the following advantages.

The present disclosure can provide a method and an apparatus for reducing Ethernet power consumption for vehicles.

Additionally, the present disclosure can provide a method and an apparatus for reducing Ethernet power consumption for vehicles which can decrease power consumption without affecting data transmission and reception by dynamically controlling a clock rate according to an idle state during Ethernet communication for a vehicle.

Furthermore, the present disclosure can minimize electromagnetic interference (EMI) by dynamically controlling a clock rate according to an idle state when Ethernet for a vehicle is used.

Moreover, the present disclosure can effectively reduce power consumption and EMI by changing the logic of a master apparatus without changing the logic of a slave apparatus in an Ethernet system for a vehicle which operates in a master-slave manner.

It will be appreciated by persons of ordinary skill in the art that the effects that can be achieved with the present disclosure are not limited to what has been particularly described hereinabove. Other advantages of the present disclosure will be more clearly understood from the following detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference is made in detail to various embodiments of the present disclosure, examples of which are illustrated in the accompanying drawings. The suffixes "module" and "unit" of elements herein are used for convenience of description and thus can be used interchangeably and do not have any distinguishable meanings or functions.

Figure 1:
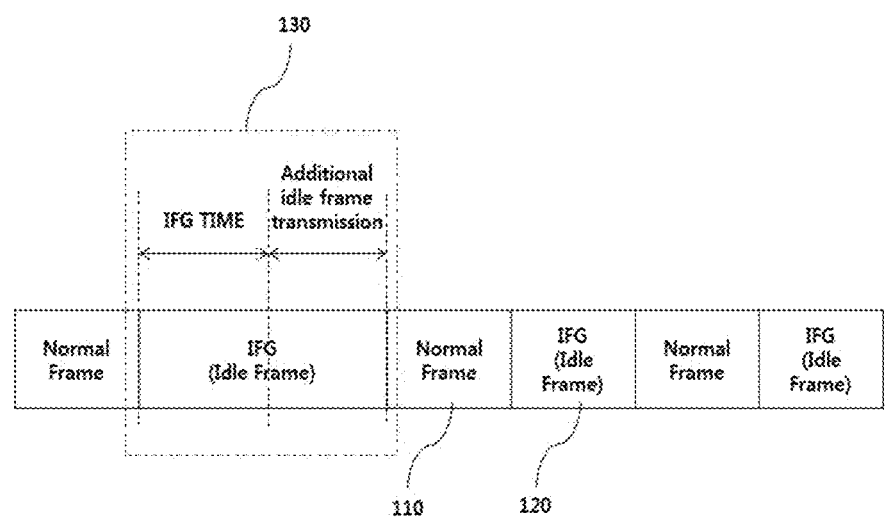
FIG. 1 is a view illustrating a method for transmitting an Ethernet frame for a vehicle.

FIG. 1 is a view illustrating a method for transmitting an Ethernet frame for a vehicle.

Referring to FIG. 1, when an Ethernet device mounted in a vehicle is initialized and an Ethernet communication connection between the Ethernet device and a device is established, data generated in a higher layer of the device is generated as a normal frame 110, which is an Ethernet frame. Additionally, the data generated in a higher layer of the device is transmitted.

In this example, an inter-frame gap (IFG) 120 is inserted between normal frames 110. The IFG 120 can provide a ready time for a reception device to normally receive the next normal frame. In other words, the IFG 120 can provide a recovery time between normal frames to a receiver as an idle frame.

For example, the IFG 120 may be set to 960 ns when an Ethernet communication network for vehicles has a bandwidth of 100 Mbps. The IFG 120 may be set to 96 ns when the bandwidth is 1 Gbps. In other words, the IFG 120 decreases as the bandwidth or transmission rate of the Ethernet communication network for vehicles, increases.

If there is no normal frame to be transmitted after the IFG, as represented by reference numeral 130, an idle frame can be continuously additionally transmitted until a normal frame to be transmitted appears.

Figure 2:
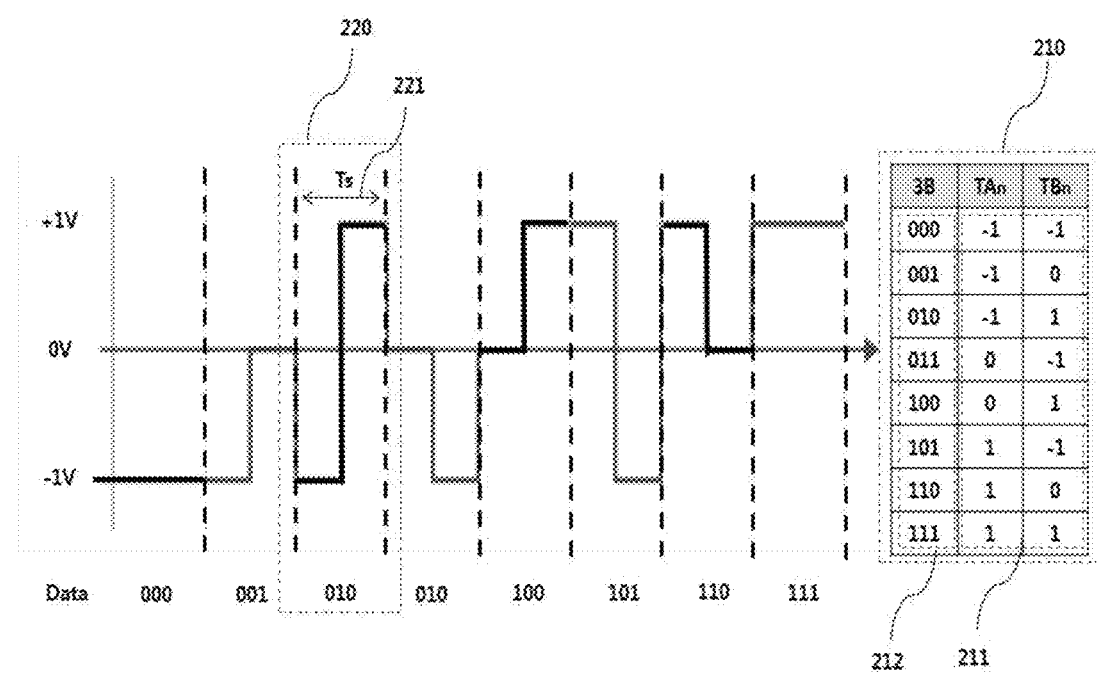
FIG. 2 is a view illustrating a method for encoding an Ethernet communication signal for vehicles.

FIG. 2 is a view illustrating a method for encoding an Ethernet communication signal for vehicles.

As shown in FIG. 2, the Ethernet communication signal for vehicles may be encoded according to 3-level pulse amplitude modulation (PAM3).

In this example, 3 levels may be 3 voltage levels (+1V, 0V and −1V) but are not limited thereto. The levels may have different voltage levels.

Accordingly, 8 signal patterns 211 using the 3 voltage levels may be mapped to 3-bit binary data 212 as shown in a table 210.

For example, a signal pattern (−1, +1) during a unit symbol period (Ts) 220 may represent a binary number 010.

An Ethernet system for vehicles to which PAM3 is applied, provides a 2A/3 symbol rate (Baud) when the bandwidth thereof is A. For example, an Ethernet communication network for vehicles having a bandwidth of 100 Mbps may provide 66.6 Mbaud (symbols/sec).

Dynamic power consumption P in communication in which signal switching occurs, such as Ethernet communication for vehicles, is proportional to the square of a voltage $V_{dd2}$ and a switching frequency $f_{clk}$.

In other words, it can be known that power consumption for communication increases as a signal switching period decreases.

Figure 3:
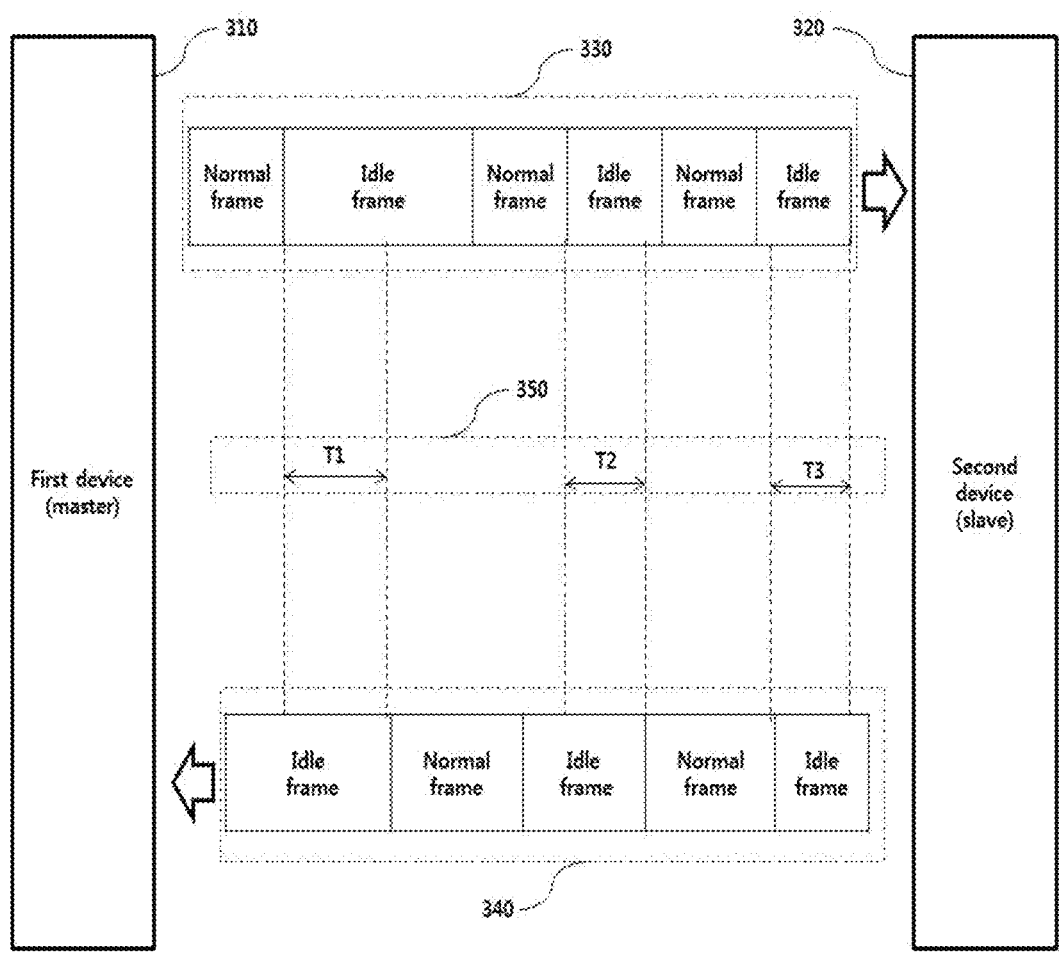
FIG. 3 is a view illustrating a method for controlling a switching frequency when a frame is transmitted and received between a master device and a slave device according to an embodiment of the present disclosure.

FIG. 3 is a view illustrating a method for controlling a switching frequency when a frame is transmitted and received between a master device and a slave device according to an embodiment of the present disclosure.

Referring to FIG. 3, reference numeral 330 denotes Ethernet frames transmitted from a first device 310 which is a master to a second device 320 which is a slave. Reference numeral 340 denotes Ethernet frames transmitted from the second device 320 which is a slave to the first device 310 which is a master.

The first device 310 and the second device 320 transmit data, to be actually transmitted through a normal frame, when the data is present. The first device 310 and the second device 320 transmit an idle frame when the data is not present.

The first device 310, which is a master, may identify states of a frame to be transmitted and a received frame to determine whether a switching frequency has changed.

The first device 310 according to the present disclosure can identify periods in which both a frame to be transmitted and a received frame are idle frames and change the switching frequency to a lower frequency during the identified period, to thereby reduce power consumption for communication, as represented by reference numeral 350.

For example, if a switching frequency used to transmit a normal frame between the first device 310 and the second device 320 is 66.6 MHz, the first device 310 which is a master can change the switching frequency from 66.6 MHz to 33.3 MHz upon detecting that both the two devices are transmitting idle frames.

Accordingly, the present disclosure changes the switching frequency only when a valid message is not present on a communication line between two devices connected to each other and thus can effectively reduce power consumption for communication without affecting an actual data transmission rate.

In addition, the present disclosure changes the switching frequency only when a valid message is not present on a communication line between two devices connected to each other and thus can minimize EMI fault.

Figure 4:
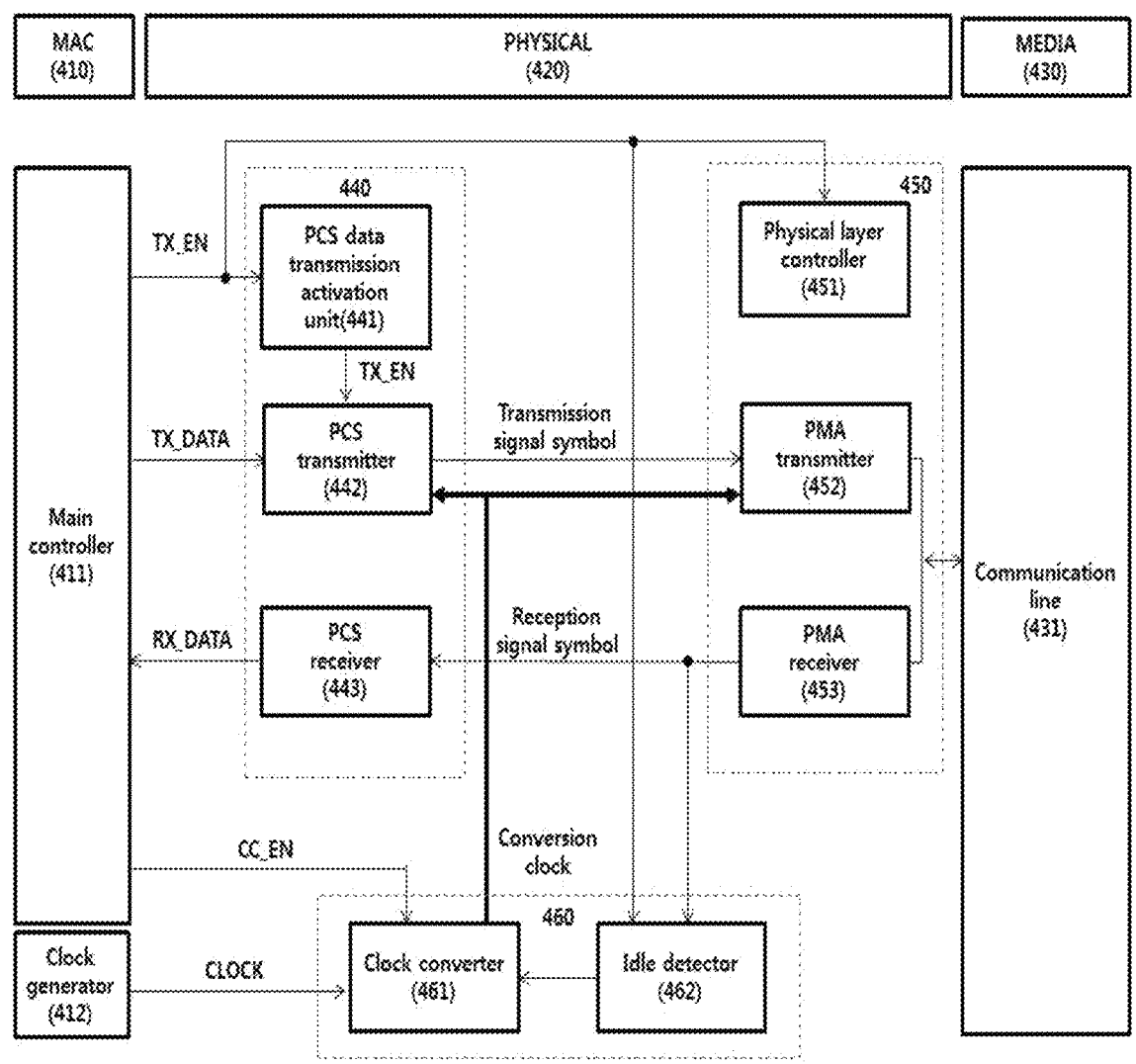
FIG. 4 is a block diagram illustrating an apparatus for reducing Ethernet power consumption for vehicles according to the present disclosure.

FIG. 4 is a block diagram illustrating an apparatus for reducing Ethernet power consumption for vehicles according to an embodiment of the present disclosure.

Specifically, FIG. 4 is a view illustrating the operation of an apparatus for reducing Ethernet power consumption for vehicles which is included in a master device.

Referring to FIG. 4, the apparatus for reducing Ethernet power consumption for vehicles may include a media access control (MAC) layer 410, a physical layer 420 and a media 430.

The MAC layer 410 may include a main controller 411 and a clock generator 412.

The physical layer 420 may include a physical coding sublayer (PCS) 440, a physical medium attachment (PMA) layer 450 and a clock controller 460.

The PCS 440 may generate transmission signal symbols based on transmission data received from the MAC layer 410 and transmit the transmission signal symbols to the PMA layer 450.

In addition, the PCS 440 may generate reception data based on reception signal symbols received from the PMA layer 450 and transmit the generated reception data to the MAC layer 410.

The PMA layer 450 may generate an Ethernet signal, or Ethernet frames, based on the transmission signal symbols received from the PCS 440. The PMA layer 450 may transmit the generated Ethernet signal to other devices through a communication line 431.

In addition, the PMA layer 450 may detect an Ethernet signal from the communication line 431, generate reception signal symbols and transmit the generated reception signal symbols to the PCS 440.

The media 430 may include a port (not shown) for Ethernet communication for vehicles and the communication line 431.

The PCS 440 may include a PCS data transmission activation unit 441, a PCS transmitter 442 and a PCS receiver 442.

The PMA layer 450 may include a physical layer controller 451, a PMA transmitter 452 and a PMA receiver 453.

The MAC layer 410 may transmit a predetermined control signal to the physical layer 420 according to presence or absence of a message to be transmitted to control Ethernet frame transmission in the physical layer 420.

Specifically, referring to FIG. 4, the main controller 411 may set a transmission enable signal (TX_EN signal) to "ON". The main controller 411 may transmit the signal TX_EN to the PCS data transmission activation unit 441 of the PCS 440 and the physical layer controller 451 of the PMA layer 450 when there is transmission data to be transmitted, i.e., a normal frame.

The PCS 440 may prepare transmission of a normal frame when the signal TX_EN is a first signal, e.g., "ON" signal, and prepare transmission of an idle frame when the signal TX_EN is a second signal, e.g., "OFF" signal.

The PCS data transmission activation unit 441 may transmit the signal TX_EN to the PCS transmitter 442 when the signal TX_EN is "ON".

The PCS transmitter 442 may receive transmission data (TX_DATA) from the main controller 441 to generate transmission signal symbols and transmit the generated transmission signal symbols to the PMA transmitter 452 when the signal TX_EN is "ON".

On the other hand, the PCS transmitter 442 may generate transmission signal symbols corresponding to an idle frame and transmit the generated transmission signal symbols to the PMA transmitter 452 upon reception of the signal TX_EN corresponding to "OFF".

The PMA receiver 453 may demodulate a PAM signal received through the communication line 431 to generate reception signal symbols. In this example, the generated reception signal symbols may be transmitted to the PCS receiver 443. The PCS receiver 443 may acquire reception data (RX_DATA) from the reception signal symbols and transmit the RX_DATA to the main controller 411.

The clock controller 460, according to the present disclosure, can dynamically control a switching frequency used to generate Ethernet frames, i.e., a clock frequency, by being connected to the PCS 440 and the PMA layer 450 as well as the main controller 411 and the clock generator 412 of the MAC layer 410.

A clock converter 461 may be operated and controlled according to a signal CC_EN received from the main controller 411.

For example, the clock converter 461 can be enabled when the signal CC_EN is "ON" and disabled when the signal CC_EN is "OFF".

The clock converter 461 may change the frequency of a clock signal supplied from the clock generator 412 according to a control signal of an idle detector 462.

The idle detector 462 may determine whether the two devices connected through communication are in an idle state based on the signal TX_EN and reception signal symbols.

Specifically, the idle detector 462 can determine that both the devices connected through communication are in an idle state when the signal TX_EN is "OFF" and a reception signal symbol pattern indicates that the following received frame is an idle frame.

For example, the idle detector 462 can determine that the following frame is an idle frame upon confirming that three consecutive reception signal symbols are an electrostatic discharge (ESD) symbol pattern, e.g., (0, 0), (0, 0) and (1, 1).

When both the devices are in an idle state as a determination result, the idle detector 462 may generate a first event signal and transmit the first event signal to the clock converter 461. When any of the two devices is not in an idle state, the idle detector 462 may generate a second event signal and transmit the second event signal to the clock converter 461.

The clock converter 461 may change the frequency of the clock signal received from the clock generator 412 into a first frequency upon reception of the first event signal. For example, the first frequency may be 25 MHz but is not limited thereto.

The clock converter 461 may maintain the frequency of the clock signal received from the clock generator 412 or convert the frequency into a second frequency upon reception of the second event signal.

In this example, the second frequency is higher than the first frequency.

Communication power consumption due to a clock signal having the second frequency is greater than communication power consumption due to a clock signal having the first frequency. Accordingly, the present disclosure can minimize power consumption in a vehicle standby state and/or Ethernet communication by controlling two devices connected through Ethernet communication to use a clock signal having a low frequency when both devices are in an idle state.

The clock signal converted by the clock converter 461 is provided to the PCS transmitter 442 and the PMA transmitter 452.

The PCS transmitter 442 and the PMA transmitter 452 may generate Ethernet frames based on the clock signal supplied from the clock converter 461.

If the signal CC_EN is "OFF", the clock converter 461 of the clock controller 460 is disabled and the clock signal supplied from the clock generator 412 may bypass the clock controller 460 and be provided to the PCS transmitter 442 and the PMA transmitter 452.

If the signal CC_EN is "ON" and the signal TX_EN is "OFF", the clock controller 460 may bypass the clock signal received from the clock generator 412 such that the clock signal can be provided to the PCS transmitter 442 and the PMA transmitter 452.

Further, when a reception frame symbol is a zero symbol, i.e., (0, 0), in a state in which the signal CC_EN is "ON" and the signal TX_EN is "OFF, the clock controller 460 may bypass the clock signal received from the clock generator 412 such that the clock signal can be provided to the PCS transmitter 442 and the PMA transmitter 452. In this example, a zero symbol represents that a normal frame starts thereafter.

Accordingly, when a reception frame symbol is not a zero symbol in a state in which the signal CC_EN is "ON" and the signal TX_EN is "OFF, the clock controller 460 may convert the clock signal received from the clock generator 412 and provide the converted clock signal to the PCS transmitter 442 and the PMA transmitter 452. In this example, the frequency of the converted clock signal is lower than the frequency of the clock signal before being converted.

Figure 5:
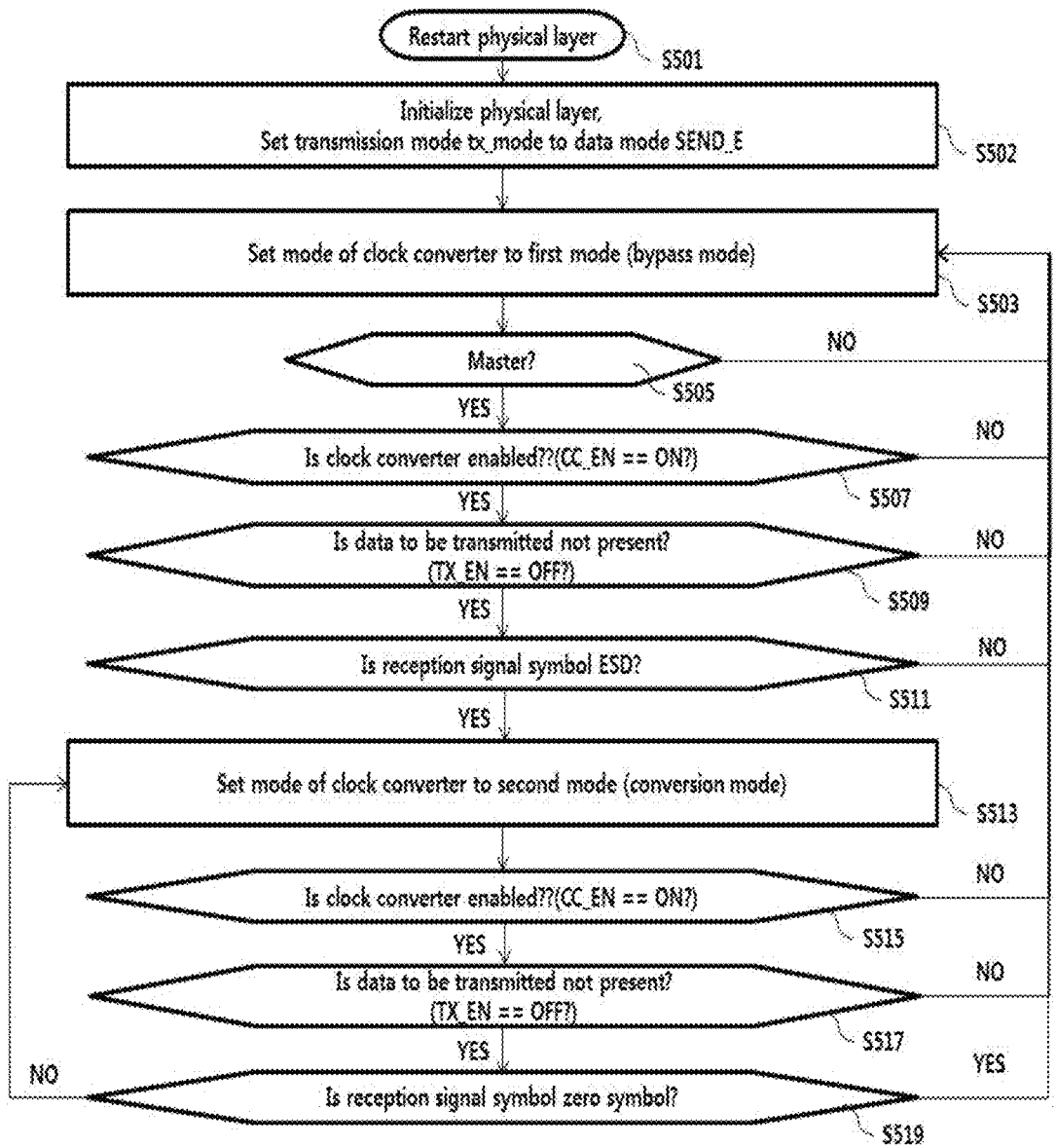
FIG. 5 is a flowchart illustrating a method for reducing Ethernet power consumption for vehicles according to an embodiment of the present disclosure.

FIG. 5 is a flowchart for describing a method for reducing Ethernet power consumption according to an embodiment of the present disclosure.

The method for reducing Ethernet power consumption shown in FIG. 5 may be performed by an electronic control unit (ECU) which is mounted in a vehicle to perform Ethernet communication.

Hereinafter, an ECU which performs the method for reducing Ethernet power consumption for vehicles is referred to as a device. FIG. 4 is referred to in order to aid in understanding the method for reducing Ethernet power consumption performed by the device.

Referring to FIG. 5, the device may initialize a physical layer when the physical layer is restarted (S501) and set a transmission mode (tx_mode) to a data mode SEND_N in which data can be transmitted and received (S502).

In Ethernet communication for vehicles, transmission modes include an idle mode SEND_I in which data cannot be transmitted and the data mode SEND_N in which data can be transmitted.

The device may set the operation mode of the clock converter 461 to a first mode (bypass mode) (S503). In the bypass mode, the clock converter 461 may bypass a clock signal received from the clock generator 412 to provide the clock signal to the PCS transmitter 442 and the PMA transmitter 452.

The device may check whether the device is a master (S505). In Ethernet communication networks for vehicles, a slave device can acquire synchronization by receiving a reference clock signal from a master device.

When the device is a master from the checking result, the device may check whether the clock converter 461 has been enabled (S507). In this step, the clock converter 461 may be enabled or disabled according to the signal CC_EN. For example, the clock converter 461 may be enabled when the signal CC_EN is "ON" and disabled when the clock signal CC_EN is "OFF".

The clock converter 461 according to the present embodiment may be enabled only in the master device.

When the device is not a master from the checking result in step S505, the device can return to step S503.

The device may check whether there is data to be transmitted when the clock converter 461 has been enabled (S509). In this step, presence or absence of data to be transmitted can be identified by the signal TX_EN.

For example, the signal TX_EN can represent that there is data to be transmitted when the signal is "ON" and represent that there is no data to be transmitted when the signal is "OFF".

When there is no data to be transmitted from the checking result in step S509, the device may check whether reception signal symbols are electrostatic discharge (ESD) symbols (S511). Upon confirmation that three reception signal symbols are predetermined ESD symbols, for example, (0, 0), (0, 0) and (1, 1), the idle detector 462 included in the device according to the present disclosure can determine that a frame received thereafter is an idle frame.

When the reception signal symbols are ESD symbols from the checking result, the device may set the operation mode of the clock converter 461 to a second mode (conversion mode) (S513).

When the clock converter 461 enters the second mode, the clock converter 461 can change the frequency of a clock signal received from the clock generator 412 to a lower frequency and provide the clock signal to the PCS transmitter 442 and the PMA transmitter 452.

In a state in which the operation mode of the clock converter 461 has been converted into the second mode, the device may check whether the clock converter 461 has been enabled (signal CC_EN="ON"?) (S515), check whether there is no data to be transmitted (signal TX_EN="OFF"?) (S517) and check whether a reception signal symbol is a zero symbol according to checking results (S519). For example, a zero symbol may be (0, 0) and can represent starting of a normal frame.

Specifically, the device may check whether a reception signal symbol is a zero symbol when there is no data to be transmitted in a state in which the clock converter 461 has been enabled.

When the reception signal symbol is not a zero symbol from the checking result, the device may maintain the operation mode of the clock converter 461 as the second mode. On the other hand, when the reception signal symbol is a zero symbol from the checking result, the device may change the operation mode of the clock converter 461 from the second mode to the first mode.

Further, when the corresponding conditions are not satisfied as results in steps S507, S509, S511, S515 and S517, the device may return to step S503.

Although various elements of an embodiment of the disclosure may have been explained as assembled or operatively connected as a unit, this is an example only and is not to be considered as a limitation of the disclosure. Alternatively, within the scope of the present disclosure, the respective elements may be selectively and operatively combined in any numbers. Every one of the elements may also be implemented as hardware while the respective ones can be combined in part or as a whole selectively and implemented in a computer program having program modules for executing functions of the hardware equivalents. Code or code segments to constitute such a program may be easily deduced by a person of ordinary skill in the art. The computer program may be stored in computer readable media, which in operation can realize the aspects of the present disclosure. Some examples of computer readable media may include magnetic recording media, optical recording media, and carrier wave media.

In addition, terms like "include", "comprise" and "have" should be interpreted by default as inclusive or open rather than exclusive or closed unless expressly defined to the contrary. All the terms that are technical, scientific or otherwise agree with the meanings as understood by a person of ordinary skill in the art unless defined to the contrary. Common terms as found in dictionaries should be interpreted in the context of the related technical writings not too ideally or impractically unless this disclosure expressly defines them so.

It may be understood that, although the terms first, second, A, B, (a), (b), etc. may be used herein to describe various elements of the present disclosure, these terms are only used to distinguish one element from another element and necessity, order, or sequence of corresponding elements are not limited by these terms. It will be understood that when one element is referred to as being "connected to", "coupled to", or "access" another element, one element may be "connected to", "coupled to", or "accessing" another element via a further element although one element may be directly connected to or directly access another element.

The above-described method for reducing Ethernet power consumption for vehicles can be implemented with computer-readable code in a computer-readable recording medium. The computer-readable medium may include all kinds of recording media capable of storing data readable by a computer system. For example, the computer-readable medium may include a read only memory (ROM), a random access memory (RAM), a magnetic tape, a magnetic disk, a flash memory, an optical data storage device, and the like. Furthermore, the computer-readable recording medium may be distributed to a computer system connected via a computer communication network, stored as code readable in a distributed manner, downloaded to a corresponding device and executed therein.

Although various aspects of the present disclosure have been described for illustrative purposes, those of ordinary skill in the art will appreciate that various modifications, additions and substitutions are possible, without departing from essential characteristics of the disclosure.

What is claimed is:

1. A method for reducing power consumption in an electronic control unit (ECU) equipped with an Ethernet communication function and mounted in a vehicle, the method comprising:
    initializing a physical layer upon restarting of the physical layer and setting a transmission mode to a data mode;
    generating a clock signal having a first frequency for Ethernet communication;
    checking presence or absence of a normal frame to be transmitted;
    checking presence or absence of an idle frame based on a reception signal symbol; and
    determining whether to change the frequency of the clock signal based on checking results in the checking of presence or absence of a normal frame and in the checking of presence or absence of an idle frame.

2. The method according to claim 1, wherein, upon checking that a normal frame to be transmitted is not present in the checking of presence or absence of a normal frame and an idle frame is present in the checking of presence or absence of an idle frame, the first frequency of the clock signal is changed to a second frequency.

3. The method according to claim 2, wherein, when a normal frame to be transmitted is present or a frame checked based on the reception signal symbol is a normal frame in a state in which the first frequency has been changed to the second frequency, the frequency of the clock signal is changed to the first frequency.

4. The method according to claim 3, wherein, when the reception signal symbol is a zero symbol (0, 0) in a state in which a normal frame to be transmitted is not present, a frame receiver thereafter is determined to be a normal frame and the frequency of the clock signal is changed to the first frequency.

5. The method according to claim 2, wherein the second frequency is lower than the first frequency.

6. The method according to claim 1, further comprising identifying whether the ECU is a master device,
    wherein the frequency of the clock signal is changeable only when the ECU is a master device.

7. The method according to claim 1, wherein the checking of presence or absence of an idle frame comprises checking whether a reception signal symbol pattern is a predefined electrostatic discharge (ESD) symbol pattern, and
    wherein a frame received thereafter is determined to be the idle frame when the reception signal symbol pattern is the ESD symbol pattern.

8. The method according to claim 1, wherein the ESD symbol pattern is composed of three consecutive reception signal symbols (0, 0), (0, 0) and (0, 1).

9. The method according to claim 1, wherein the idle frame has a variable length.

10. An apparatus for reducing Ethernet power consumption for vehicles, mounted in a vehicle to perform Ethernet communication, the apparatus comprising:
    a media access control (MAC) layer including a main controller and a clock generator; and
    a physical layer for processing data transmitted/received to/from the MAC layer to perform Ethernet communication,
    wherein the physical layer comprises:
    a physical coding sublayer (PCS) transmitter for generating transmission signal symbols based on transmission data received by the main controller;
    a physical medium attachment (PMA) transmitter for generating an Ethernet signal based on the transmission signal symbols received from the PCS transmitter and transmitting the Ethernet signal through a communication line;
    a PMA receiver for generating reception signal symbols based on an Ethernet signal detected in the communication line;
    a PCS receiver for receiving the reception signal symbols from the PMA receiver, generating reception data and transmitting the reception data to the main controller; and
    a clock controller for receiving a clock signal having a first frequency from the clock generator and changing the frequency of the clock signal based on a communication state on the communication line.

11. The apparatus according to claim 10, wherein the clock controller comprises:
    an idle detector for determining a time at which the frequency of the clock signal is changed based on a transmission enable signal (signal TX_EN) received from the main controller and the reception signal symbols; and
    a clock converter for changing the frequency of the clock signal according to a control signal of the idle detector and outputting the clock signal.

12. The apparatus according to claim 11, wherein the clock signal output from the clock converter is provided to the PCS transmitter and the PMA transmitter.

13. The apparatus according to claim 11, wherein, when the idle detector confirms that a normal frame to be transmitted is not present according to the signal TX_EN and confirms that a frame to be received is an idle frame according to the reception signal symbols, the frequency of the clock signal is changed to a second frequency.

14. The apparatus according to claim 13, wherein, the clock converter changes the frequency of the clock signal to the first frequency when a normal frame to be transmitted is present or a frame checked based on the reception signal symbols is a normal frame in a state in which the frequency of the clock signal has been changed to the second frequency.

15. The apparatus according to claim 13, wherein, when the reception signal symbols are zero symbols (0, 0) in a state in which a normal frame to be transmitted is not present, a frame to be received thereafter is determined to be a normal frame and the frequency of the clock signal is changed to the first frequency.

16. The apparatus according to claim 13, wherein the second frequency is lower than the first frequency.

17. The apparatus according to claim 10, wherein the frequency of the clock signal is changeable only when the apparatus for reducing Ethernet power consumption for vehicles is a master device.

18. The apparatus according to claim 13, wherein the idle detector checks whether a reception signal symbol pattern is a predefined ESD symbol pattern and determines that a frame received thereafter is an idle frame when the reception signal symbol pattern is the ESD symbol pattern.

19. The apparatus according to claim 18, wherein the ESD symbol pattern is composed of three consecutive reception signal symbols (0, 0), (0, 0) and (0, 1).

20. The apparatus according to claim 10, wherein the main controller transmits a clock converter enable signal (signal CC_EN) for enabling or disabling the operation of the clock converter to the clock controller, and the clock controller bypasses a clock signal from the clock generator such that the control signal is provided to the PCS transmitter and the PMA transmitter when the clock converter is disabled by the signal CC_EN.

\* \* \* \* \*